(12) United States Patent
Casey (10) Patent No.: US 7,337,504 B1
(45) Date of Patent: Mar. 4, 2008

(54) QUICK ENGAGE/DISENGAGE ROPE CLEAT

(76) Inventor: William E. Casey, 18125 Rose Ct., Los Gatos, CA (US) 95033

( * ) Notice: Subject to any disclaimer, the term of this patent is extended or adjusted under 35 U.S.C. 154(b) by 0 days.

(21) Appl. No.: 09/592,095

(22) Filed: Jun. 12, 2000

(51) Int. Cl.
 *F16G 11/10* (2006.01)
(52) U.S. Cl. .................... 24/134 P; 24/134 R; 114/218
(58) Field of Classification Search .. 24/134 R–134 P; 188/65.1; 114/199, 218; 182/5
 See application file for complete search history.

(56) References Cited

U.S. PATENT DOCUMENTS

| | | | | |
|---|---|---|---|---|
| 387,772 | A | * | 8/1888 | Debus ........................... 182/5 |
| 432,756 | A | * | 7/1890 | Mains |
| 1,382,046 | A | * | 6/1921 | Zimmerman, Jr. ......... 24/134 R |
| 2,262,162 | A | * | 11/1941 | Bock ........................ 24/134 P |
| 2,387,436 | A | * | 10/1945 | Frank |
| 3,125,058 | A | * | 3/1964 | Peterson |
| 3,750,611 | A | * | 8/1973 | Field ........................... 114/218 |
| 3,824,653 | A | * | 7/1974 | Sholler |
| 4,397,253 | A | * | 8/1983 | Uecker et al. .............. 114/218 |
| 4,453,486 | A | * | 6/1984 | Harken ....................... 114/218 |
| 4,685,500 | A | * | 8/1987 | Silvia |
| 4,766,835 | A | | 8/1988 | Randall ...................... 114/218 |
| 4,899,423 | A | | 2/1990 | Randall ......................... 24/134 |
| 5,401,011 | A | * | 3/1995 | Gatenby et al. ............ 269/131 |
| 5,548,873 | A | | 8/1996 | Macias ......................... 24/134 |
| 5,800,105 | A | | 9/1998 | Stump ......................... 410/103 |
| 5,860,793 | A | * | 1/1999 | Muscarella et al. .......... 417/388 |

* cited by examiner

*Primary Examiner*—James R Brittain
(74) *Attorney, Agent, or Firm*—Robert Samuel Smith (57) ABSTRACT

A rope cleat including at least rope abutment and at least one cam mounted on a flat base surface. The cam is spring biased to rotate toward an abutment surface. A cover is positionable over the cam and abutment such that, in one position, the rope is restrained from inadvertent withdrawal from between the cam and abutment and in another position permits quick engagement and withdrawal of the rope from between the cam and abutment. One version of the invention is a sliding cover. Another version of the invention is a cover that is rotatable between the retain and withdrawal positions. Yet another version is a flip up cover. In one embodiment, a single cam-abutment-cover assembly is mounted on the base surface. In another embodiment, a cam-abutment-cover pair is mounted on the base surface. In another embodiment, a cam-cam-cover is mounted on a base surface where the cams rotate toward each other to secure the rope. In yet another embodiment, a cam-cam-cover is mounted on a base surface where the cams rotate toward the same abutment but start 180° from each other on the same pin or two pins in line with the abutment. In this embodiment, once the rope is between the cams and the abutment it is prevented from moving in either direction until disengaged. The principles of the quick release cover of this invention are applicable to a plurality of cam-cam, abutment-cam combinations.

7 Claims, 6 Drawing Sheets

QUICK ENGAGE/DISENGAGE ROPE CLEAT

FIELD OF THE INVENTION

This invention relates to cleats for securing ropes in applications such as on trucks and trailers and more particularly to a cleat that features quick engagement, quick secure, quick locking and quick release.

In the context of this specification, the word, "rope", is understood to apply also to cable or similar restraining material

BACKGROUND AND INFORMATION DISCLOSURE

The ability to tie down an end or middle of a taut rope quickly and securely and to release it quickly is an essential requirement in activities such as tying cargo down on trucks, trailers, boats, particularly sail boats, dismantling canopies, flag poles, clothes lines, etc.

Numerous devices have been disclosed which are intended to improve on the earliest methods which included simply tying the end of the rope around a peg or pole.

A cam type rope cleat includes as a minimum a base with base surface upon which is mounted a rotatable cam and a rope abutment against which the cam presses the rope.

Numerous versions of cleats have been disclosed which are intended to improve the operation of the rope cleat in terms of speed of engagement and disengagement, resistance to slippage and inadvertent disengagement.

For example, U.S. Pat. No. 4,766,835 to Randall discloses cam spindles mounted on a base and extending through a top plate on which are mounted a pair of back to back rope abutments.

U.S. Pat. No. 4,878,270 to Randall discloses a rope tie-down clamp apparatus for tightening and securing a rope between two points.

U.S. Pat. No. 4,899,423 to Randall discloses a cleat in which the cam has a circumferential groove to improve gripping strength.

U.S. Pat. No. 5,548,873 to Macias discloses a self locking cleat for a rope including a housing, a rotatable generally spherically shaped engaging member (cam) spring biased toward clamping the rope against an abutment but which is released from the rope by a manual lever.

None of the disclosures provide the advantages of quick engagement, quick release and quick security to the degree that is inherent in the present invention.

SUMMARY OF THE INVENTION

It is an object of this invention to provide a rope cleat that is characterized as providing a very quick engagement, protection against inadvertent release, and very quick release when required, It is another object to provide a cleat that permits holding a rope looped back from its original direction.

Another object of the invention is to provide a configuration of the a cam and rope abutment that is characterized by greater gripping strength than is provided by devices of the prior art.

This invention is directed toward a rope cleat comprising at least one cam swivally mounted on a base that is spring biased to rotate toward an abutment to seize a rope positioned between the surfaces of the cam and abutment.

A cover is manually located in a closed position over the rope when it is required to prevent the rope from escaping from between cam and abutment. The cover is located in a release position when it is required to quickly engage of disengage the rope from the cleat.

In one embodiment the cover is slidable from the closed position to the release position. In another embodiment, the cover is swivally mounted to rotate from the cover position to the release position. In another version, the cover flips up to permit engagement and release of the rope.

In yet another embodiment, the cover is fixed and extends over an area of the base where the rope has been looped around the abutment and extends back in the direction from whence it came.

In one version, the cleat of this invention comprises a single cam in combination with a single abutment and a cover to secure the rope.

In another version, two abutments are arranged in combination with two cams to engage one rope or a pair of ropes with a cover or pair of covers.

In another version, two spring biased cams on separate pins face each other to grip the rope with a cover to secure the rope.

Another version has two cams, each one facing an abutment and sliding covers with wings for the rope to loop around if needed.

In any of the above embodiments, a spring is positioned to bias the cam or cams to turn toward the abutment or an opposing spring biased cam or cams.

DESCRIPTION OF ILLUSTRATIVE EMBODIMENTS

Figure 1:
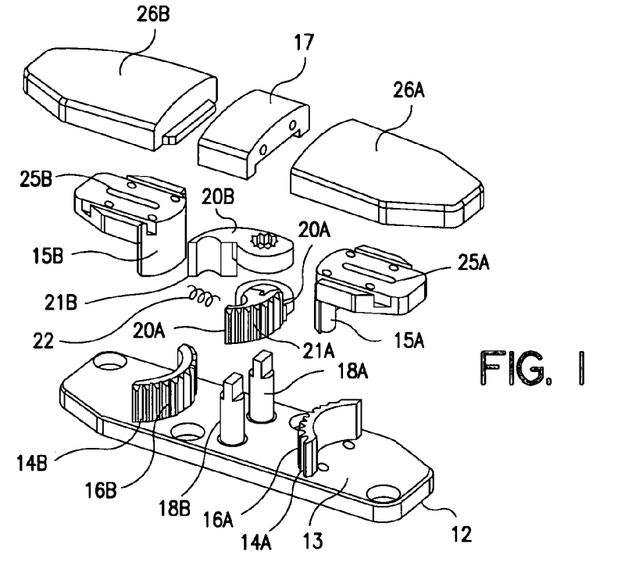
FIG. 1 is an exploded view showing two cams and abutments with sliding covers.
Figure 2:
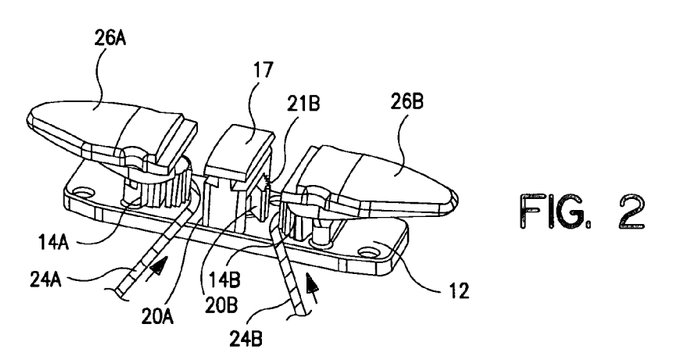
FIG. 2 is a perspective assembly view of FIG. 1 with covers open for engaging or releasing the ropes.
Figure 3:
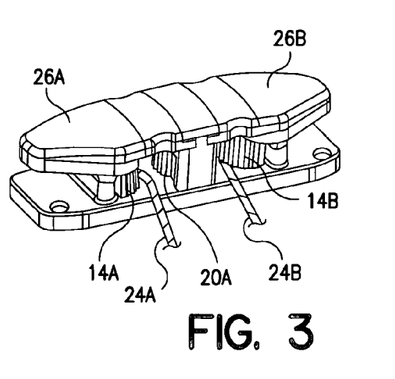
FIG. 3 is a perspective assembly view of FIG. 1 with covers closed to retain the ropes and rope looping back.

Turning now to a discussion of the drawings, FIG. 1 is an exploded perspective view of the cleat of this invention. There is shown a base 12 having a base surface 13 on which are mounted a pair of rope abutments 14A and 14B. Each abutment 14A and 14B has a toothed surface 16A and 16B facing the other abutment 24B and 24A respectively. Two spindles, 18A and 18B, are mounted on the base surface 13 between the abutments 14A,B. Two cams 20A and 20B are mounted on one spindle 18A. The second spindle, 18B, is a stop that limits rotation of cams 20A and 20 B mounted on a pair of rope abutments 14A and 14B. Each abutment 14A and 14B has a toothed surface 16 A and 16B facing the other abutment 14B and 14A respectively. One cam 20B has a toothed surface (not shown in FIG. 1) that faces toward abutment 14B and cam 20A has a toothed surface 21A facing abutment 14A. A spring 22 having one end against cam 20A and another end against cam 20B biases cam 20A and cam 20B to rotate toward respective toothed surfaces 16A and 16B. A pair of covers 26A and 26B are shown which are slideably mounted on pedestals 15A and 15B respectively so that the rope is retained when the cover is in the closed (retain position as shown in FIG. 3 and permits engagement and withdrawal of the rope from between the abutment surface and cam surface when the cover is in a release position as shown in FIG. 2. A stop 17 is shown which limits the slide distance of covers 26A and 26B in the closed position. A stop pin 17 is shown which limits the slide distance of covers 26A and 26B in the closed position. A pin (not shown) in the bottom of each of covers 26A,B slideably engage slots 25A and 25B and limit the slide distance in the open position.

FIG. 2 is a view of an assembly of FIG. 1 showing covers 26A,B open (separated from stop 17 and ropes 24A and 24B positioned between the respective cams 20A,B and abutments 14A and 14B.

FIG. 3 shows the ropes 24A and 24B in position and covers 26A,B closed. An end of each cover, 26A and 26D, extends over an area of the base on the side of the abutment 14A and 14B opposite the cam thereby shielding the rope 24A pooped back over the base 12.

Figure 4:
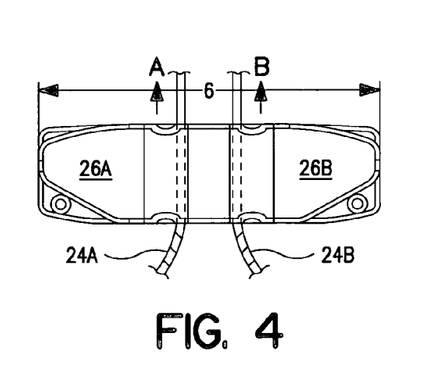
FIG. 4 is a top view showing the pair of ropes retained in the cleat and the rope looped back.

FIG. 4 is a top view of FIG. 3 showing the position of the ropes to better advantage. The covers 26A and 26B are closed presenting inadvertent escape of the ropes 24A and 24B. The ropes 24A and 24B are held lightly by spring 22 (shown in FIG. 1).

When either rope 24A or 24B is pulled (arrow A or B respectively) the frictional force of the rope 24A or 24B against the tooth surface of cam 20A or cam 20B rotates the cam 20A or 20B in a direction that seizes the rope 24A 24B between the toothed abutment surface 16A or 16B and the toothed cam surface of cams 20A and 20B, The rope 24A or 24B is free to be pulled in the opposite direction of the arrows as the cam will rotate with the respective rope.

As shown in FIG. 2, when both covers 26 A,B are slid open, a user is permitted to simply pull the rope away from engagement between the abutment 14 A,B and the respective cam 20A,B or into engagement between the abutment 14 A,B and the respective cam 20A,B when he desires to disengage or engage the rope 24 A,B from the respective cleat.

Figure 5:
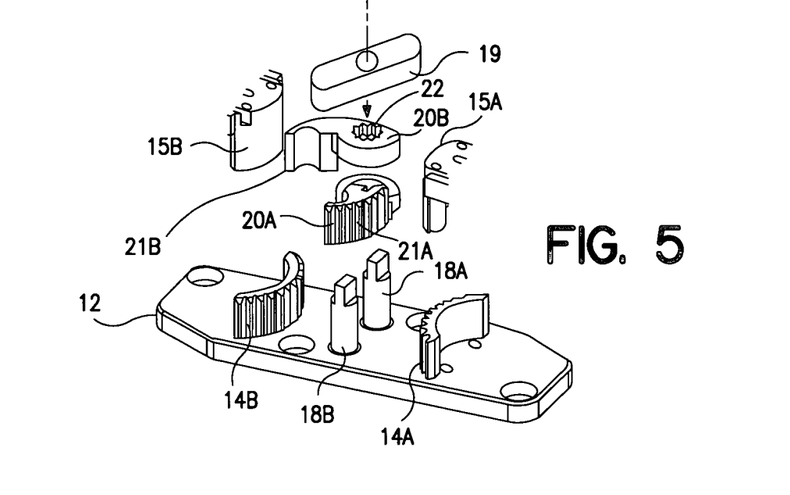
FIG. 5 is an exploded view showing a rotating cover.
Figure 6:
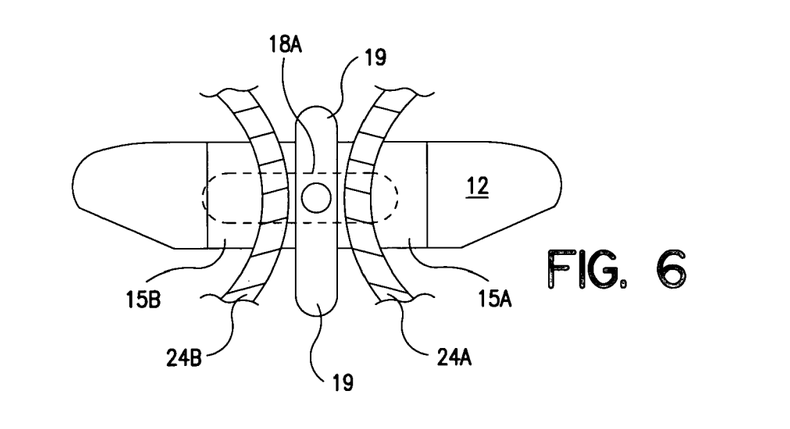
FIG. 6 is a top view of FIG. 6 showing two positions of the rotating cover.

FIG. 5 is an exploded view of another embodiment of the invention in which a rotatable cover 19 is mounted on spindle 18A. As shown in FIG. 6, the rotatable cover 19 in one position permits quick engagement or withdrawal of ropes from the cleat and in another position (shown in phantom) prevents inadvertent withdrawal from the cleat. The rotatable cover 19 (FIG. 6) replaces the sliding covers 26 A,B (FIGS. 1, 2).

Figure 7:
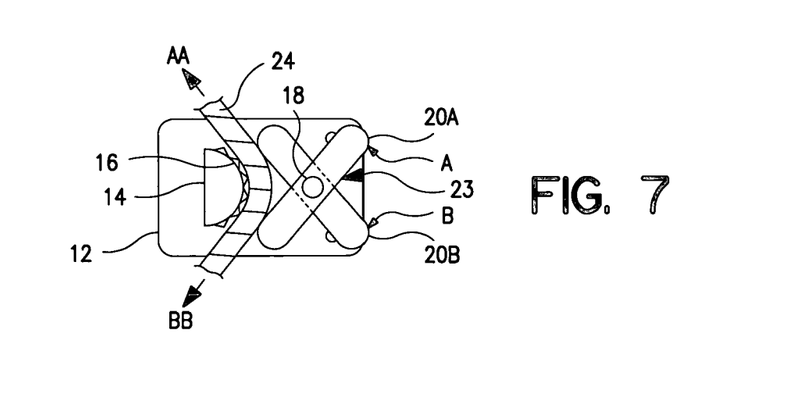
FIG. 7 shows a two way cleat.

FIG. 7 illustrates another embodiment of the invention in which the rope is prevented from being pulled in either direction, A or B. There is shown a single abutment 14 with toothed surface 16. Cam 20A and Cam 20B are rotatably mounted on a spindle 18. Spring 23 is positioned between cam 20A and cam 20B so that both cams 20 A,B rotate against surface 16 of abutment 14. To permit rope 24 to slide in direction BB, the end of cam 20B is pressed in direction B.

Figure 8:
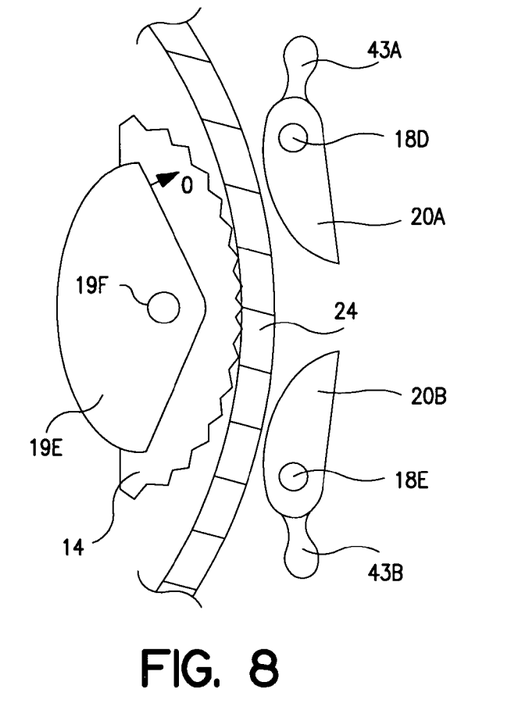
FIG. 8 shows a pair of cams facing one abutment and a rotating cover which is another version of a two way cleat.

FIG. 8 shows an embodiment for locking the rope against movement in either direction with rope 24 between pair of cams 20 A,B facing abutment 14 where each cam 20 A,B is mounted on its own spindle 18 D,E respectively Each cam 20A,B has a handle 43A,B respectively. Cover 19E is rotatably mounted on spindle 19F and is rotatable from the open position as shown to the closed position over the rope.

Figure 9:
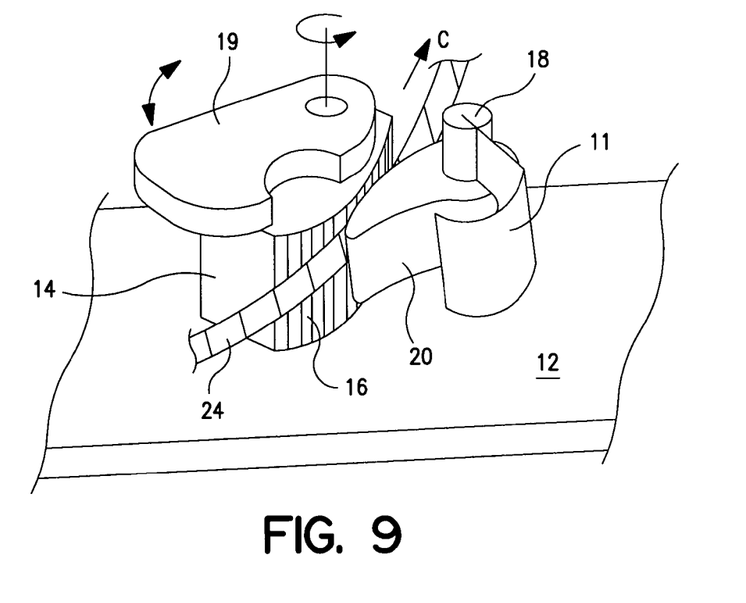
FIG. 9 shows a cleat with single cam, abutment and rotatable cover.

FIG. 9 shows an embodiment in which one cam 20, is rotatably mounted on spindle 18 and biased by spring 11 to rotate against abutment surface 16 so that rope 24 between cam 20 and abutment 14 is prevented from moving in direction C. A leaf spring 11 is shown in FIG. 9 however the scope of the invention also includes spring 11 being a torsion spring. A cover 19 is rotatably mounted on abutment 16 is rotatable between a cover position where the rope is restrained between the cam and abutment and a release position as shown in FIG. 6. In an alternative version (not shown), cover 19 is mounted on spindle 18.

Figure 10:
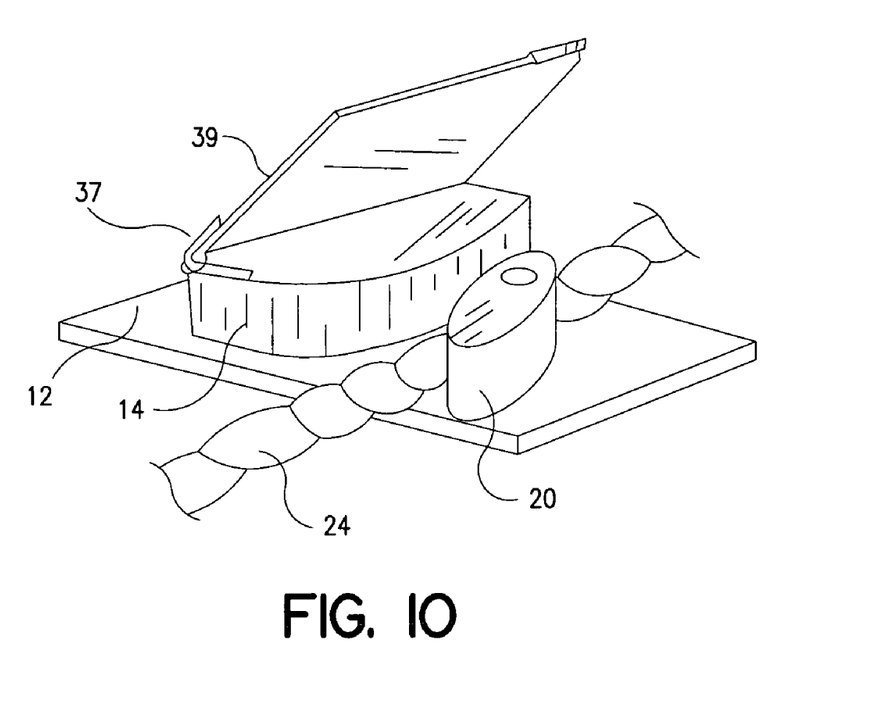
FIG. 10 shows a hinged cover.

FIG. 10 shows a version of the invention including base 12, cam 20 and abutment 14 in which the cover 39 is hingeably attached to abutment 14 and biased by spring 37 to flip down over rope 24, retained between cam 20 and abutment 14. In an alternative version, (not shown) the flip-up cover is mounted on the cam spindle.

Figure 11:
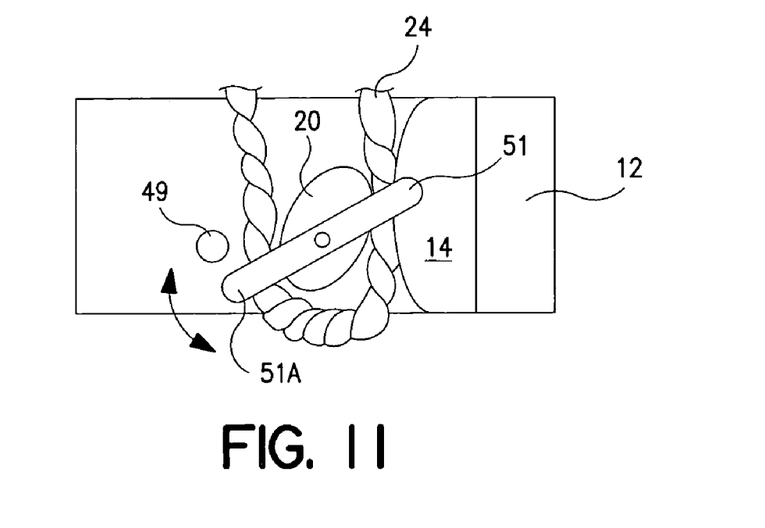
FIG. 11 shows a rotating cover with a tail for retaining a looped rope.

FIG. 11 shows a version including a rope 24 between abutment 14 and cam 20. The cam 20 and cover 51 are rotatably mounted on spindle 53. Pin 49 extends from base 12 permitting rope 24 to be looped back between pin 49 and cam 20. When cover 51 is rotated into position to retain the rope between cam 20 and abutment 14, the opposite "tail" end 51A of cover 51 retains the looped end of rope 24 between pin 49 and cam 11.

Figure 14:
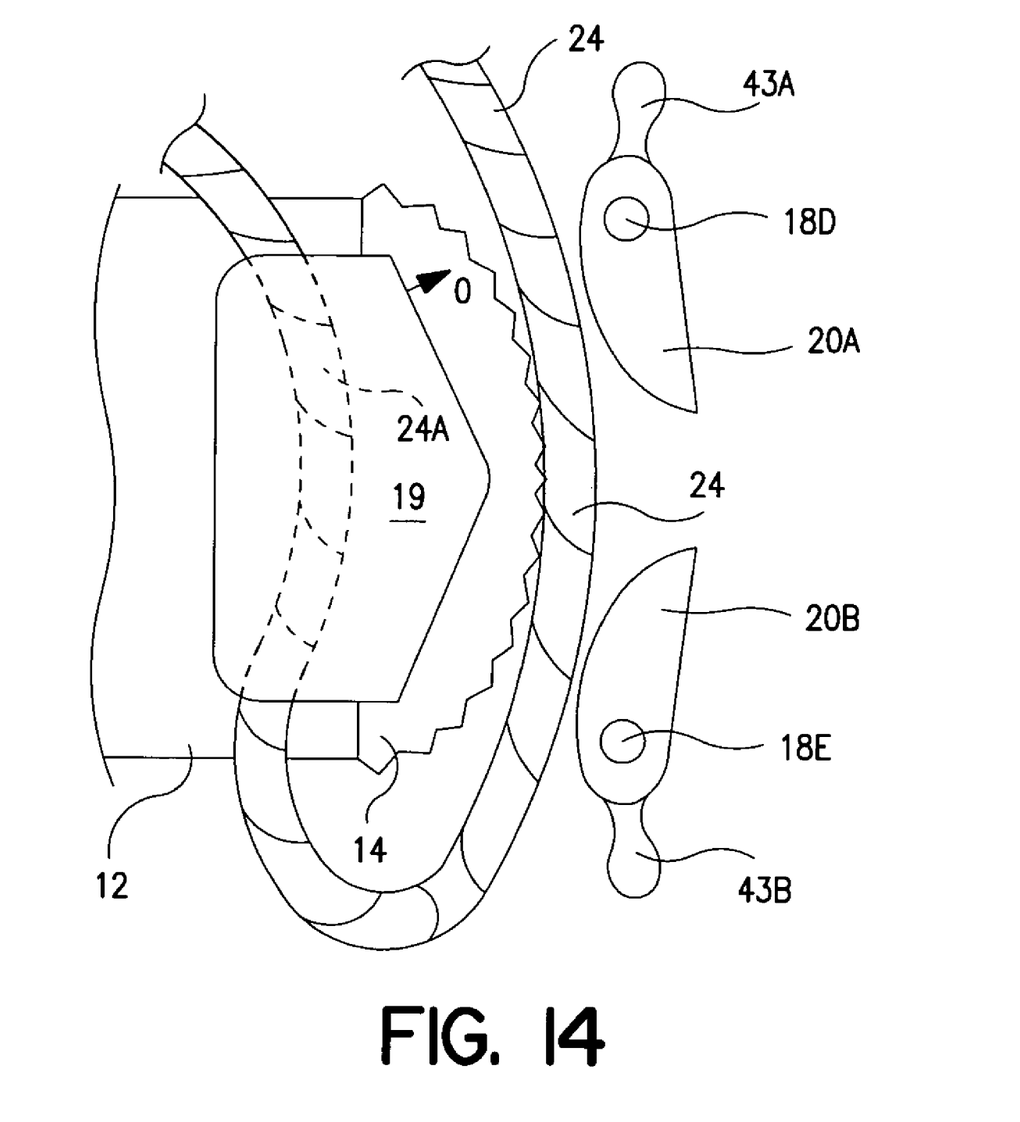
FIG. 14 shows an embodiment with a fixed cover.

In FIG. 14, the cover 19 is fixed and extends back over a section 24A of the rope 24 that has a been looped back to extend in the direction from whence it came.

There has been described a rope cleat which features at least one cam and abutment and a cover that is positionable over the cam and abutment to prevent inadvertent disengagement of the rope. Three embodiment of cover have been described including, a sliding cover, a rotating cover and a hinged cover. In some versions, the cam is biased by a spring forcing the cam to rotate toward the abutment, for further security.

In some versions, the covers have "tails" which help retain the rope when looped back In some versions, each cam has a tail which aids in disengaging the rope.

Variations and modifications of the invention may be contemplated after reading the specification and studying the drawings which are within the scope of the invention.

Figure 12:
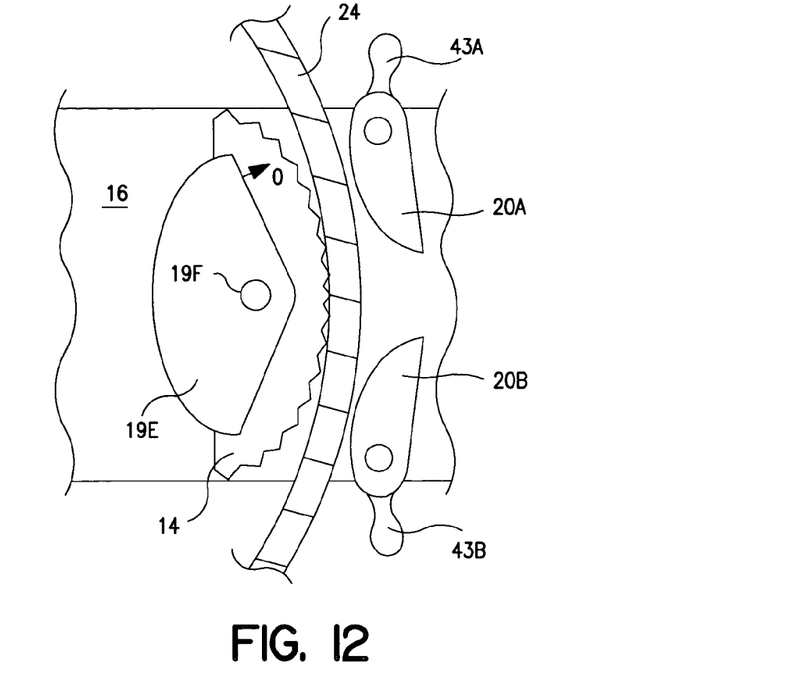
FIG. 12 shows a pair of cams arranged to seize the rope when the rope is pulled in one direction and release the rope when the rope is pulled in the opposite direction.

For example, FIG. 12 shows a pair of cams 20A and 20B oriented in the same direction to provide twice the holding strength of a single cam.

Figure 13:
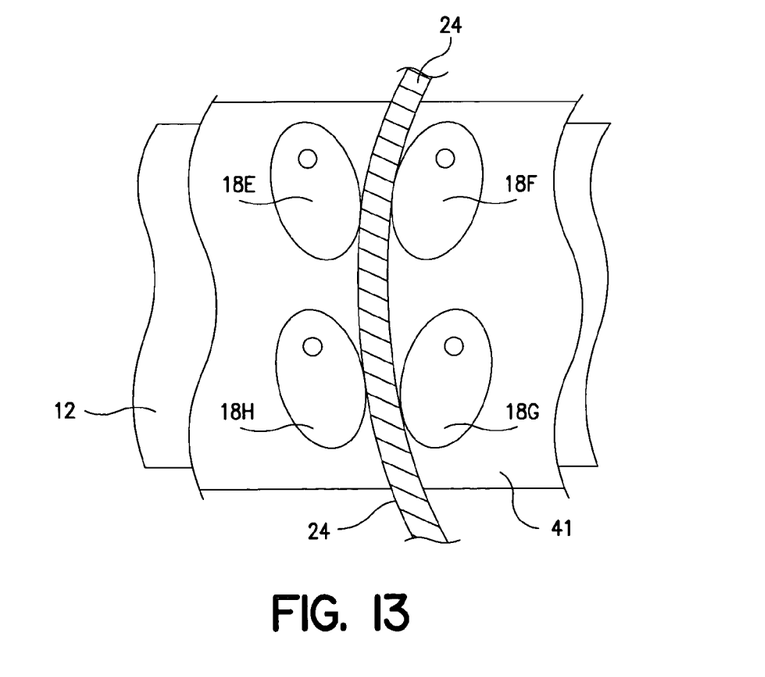
FIG. 13 shows the rope between members of each pair of a plurality of pairs of cams.

FIG. 13 shows the rope 24 positioned between the members of each pair of a plurality of pairs of cams. There are shown a first pair of cams 18J and 18F and a second pair of cams 18G and 18F. The base 12 is shown partially cutaway. The cover 41 is shown in phantom and partially cutaway.

I therefore wish to define the scope of the invention by the appended claims.

I claim:

1. A rope cleat which comprises:
   a base having a flat surface;

an abutment means for gripping rope mounted on said base surface and having an abutment surface perpendicular to said base surface;
a first spindle having one end mounted on said base surface and extending perpendicularly away from said base surface;
a first cam rotatably mounted on said first spindle;
said first cam having a first cam surface perpendicular to said base surface and convex toward said abutment surface;
said first cam operably arranged to permit positioning a rope between said first cam surface and said abutment surface and to provide that when tension is applied to said rope in one direction, said rope is seized between said first cam surface and abutment surface by said first cam rotating toward said abutment means and when tension is applied to said rope in an opposite direction, said rope is released from between said first cam surface and abutment surface permitting withdrawal of said rope;
a pedestal having one end secured to said base surface and extending perpendicularly away from said base surface;
a cover slidably engaging another end of said pedestal and operably arranged for sliding over said cam and an abutment between said retain position and said release position whereby said rope is retained between said abutment surface and said first cam surface when said cover is in a retain position and for permitting engagement and withdrawal of said rope from between said abutment surface and said first cam surface when said cover is in a release position.

2. A rope cleat which comprises:
a base having a flat base surface;
an abutment means for gripping rope mounted on said base surface and having an abutment surface perpendicular to said base surface;
a first spindle having one end mounted on said base surface and extending perpendicularly away from said base surface;
a first cam rotatably mounted on said first spindle;
said first cam having a first cam surface perpendicular to said base surface and convex toward said abutment surface;
said first cam operably arranged to permit positioning a rope between said first cam surface and said abutment surface and to provide that when tension is applied to said rope in one direction, said rope is seized between said first cam surface and abutment surface by said first cam rotating toward said abutment means and when tension is applied to said rope in an opposite direction, said rope is released from between said first cam surface and abutment surface permitting withdrawal of said rope;
a cover means rotatably mounted on said abutment means for retaining said rope between said abutment surface and said first cam surface when said cover means is in a retain position and for permitting engagement and withdrawal of said rope from between said abutment surface and said first cam surface when said cover means is in a release position;
said cover means is operably arranged to rotate between said retain and release positions;
said cover means has one end which is rotatable over space between said abutment surface and cam surface and a tail end;
a pin extending from said base surface on a side of said abutment means opposite said cam providing that, when said rope is positioned between said abutment surface and said cam surface and looped around said abutment surface between said pin and said abutment means, then when said cover means is rotated to said retain position, said tail end of said cover means extends over space between said pin and said abutment means.

3. A rope cleat which comprises:
a base having a flat base surface;
an abutment means for gripping rope mounted on said base surface and having an abutment surface perpendicular to said base surface;
a first spindle having one end mounted on said base surface and extending perpendicularly away from said base surface;
a first cam rotatably mounted on said first spindle;
said first cam having a first cam surface perpendicular to said base surface and convex toward said abutment surface;
said first cam operably arranged to permit positioning a rope between said first cam surface and said abutment surface and to provide that when tension is applied to said rope in one direction, said rope is seized between said first cam surface and abutment surface by said first cam rotating toward said abutment means and when tension is applied to said rope in an opposite direction, said rope is released from between said first cam surface and abutment surface permitting withdrawal of said rope;
a cover means for retaining said rope between said abutment surface and said first cam surface when said cover means is in a retain position and for permitting engagement and withdrawal of said rope from between said abutment surface and said first cam surface when said cover means is in a release position;
a second cam mounted on another end of said spindle;
said second cam having a second cam surface perpendicular to said base surface and convex toward said abutment surface; and
said second cam surface operably arranged to permit positioning a rope between said second cam surface and said abutment surface providing that when tension is applied to said rope in one direction, said rope is seized between said second cam surface and abutment surface by said second cam rotating toward said abutment means and when tension is applied to said rope in an opposite direction, said rope is seized by said first cam.

4. A rope cleat which comprises:
a base having a flat base surface;
an abutment means for gripping rope mounted on said base surface and having an abutment surface perpendicular to said base surface;
a first spindle having one end mounted on said base surface and extending perpendicularly away from said base surface; a first cam rotatably mounted on said first spindle;
said first cam having a first cam surface perpendicular to said base surface and convex toward said abutment surface;
said first cam operably arranged to permit positioning a rope between said first cam surface and said first abutment surface and to provide that when tension is applied to said rope in one direction, said rope is seized between said first cam surface and abutment surface by said first cam rotating toward said abutment means and when tension is applied to said rope in an opposite direction, said rope is released from between said first cam surface and abutment surface permitting withdrawal of said rope;

a cover means for retaining said rope between said abutment surface and said first cam surface when said cover means is in a retain position and for permitting engagement and withdrawal of said rope from between said abutment surface and said first cam surface when said cover means is in a release position;

a second cam mounted on another end of said spindle;

said second cam having a second cam surface perpendicular to said base surface and convex toward said abutment surface; and said second cam surface operably arranged to permit positioning a rope between said second cam surface and said abutment surface providing that when tension is applied to said rope in one direction, said rope is seized between said second cam surface and abutment surface by said second cam rotating toward said abutment means and when tension is applied to said rope in an opposite direction, said rope is seized by said first cam;

spring means having one spring end abutting said first cam and a second spring end abutting said second cam operably arranged to bias said first cam surface toward said abutment means and said second cam surface toward said abutment means;

means for manually rotating said first and second cams away from said abutment means.

5. The rope of cleat claim 3 wherein said abutment means comprises:

a first abutment having a first abutment surface facing said first cam surface;

a second abutment facing said second cam surface.

6. A rope cleat comprising:

a base having a base surface;

a first rope abutment mounted on said base surface and having a first abutment surface perpendicular to said base surface;

a second rope abutment mounted on said base surface and having a second abutment surface perpendicular to said base surface;

a first spindle having one end mounted on said base surface and extending perpendicularly away from said base surface;

a first cam rotatably mounted on said first spindle;

said first cam having a first cam surface perpendicular to said base surface and convex toward said first abutment surface;

said first cam operably arranged to permit positioning a rope between said first cam surface and said first abutment surface and to provide that when tension is applied to said rope in one direction, said rope is seized between said first cam surface and first abutment surface by said first cam rotating toward said first rope abutment and when tension is applied to said rope in an opposite direction, said rope is released from tension and can be removed from said rope cleat;

a second cam rotatably mounted on said first spindle;

said second cam having a second cam surface perpendicular to said base surface and convex toward said second abutment surface;

said second cam operably arranged to permit positioning a rope between said second cam surface and said second abutment surface and to provide that when tension is applied to said rope in one direction, said rope is seized between said second cam surface and second abutment surface by said second cam rotating toward said second rope abutment and when tension is applied to said rope in an opposite direction, said rope is released from tension and can be removed from said cleat;

a second spindle having one end mounted on said base surface and extending perpendicularly away from said base surface;

said second spindle positioned to limit rotation of said first cam away from said first abutment and to limit rotation of said second cam away from said second abutment surface;

a spring positioned with one end abutting said first cam and another end abutting said second cam operably arranged to bias said first cam surface toward said first abutment surface and to bias said second cam surface toward said second abutment surface;

a first pedestal having one end secured to said base surface and extending perpendicularly away from said base surface;

a first cover slidably mounted on another end of said first pedestal and operably arranged to slide between a position where said rope is restrained from escaping from between said first abutment surface and said first cam surface by a first end of said first cover and a position where said rope is permitted to be engaged and withdrawn from between said first abutment surface and said first cam surface;

a second pedestal having one end secured to said base surface and extending perpendicularly away from said base surface;

a second cover slidably mounted on another end of said second pedestal and operably arranged to slide between a position where said rope is restrained from escaping from between said second abutment surface and said second cam surface by a first end of said second cover and a position where said rope is permitted to be engaged and withdrawn from between said second abutment surface and said second cam surface.

7. The cleat of claim 6 wherein said first and second covers each have a second end opposite said respective first end operably arranged when said respective covers are in said position where said rope is restrained to extend over said base surface.

* * * * *